(12) United States Patent
Zhang et al.

(10) Patent No.: US 10,470,048 B2
(45) Date of Patent: Nov. 5, 2019

(54) DYNAMIC TIME-DIVISION DUPLEXING (TDD) IN NEW RADIO-SPECTRUM SHARING (NR-SS) AND SELF-CONTAINED SUBFRAME STRUCTURE

(71) Applicant: QUALCOMM Incorporated, San Diego, CA (US)

(72) Inventors: Xiaoxia Zhang, San Diego, CA (US); Taesang Yoo, San Diego, CA (US); Seyed Ali Akbar Fakoorian, San Diego, CA (US); Siddhartha Mallik, San Diego, CA (US); Juan Montojo, San Diego, CA (US); Jing Lei, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 85 days.

(21) Appl. No.: 15/641,780

(22) Filed: Jul. 5, 2017

(65) Prior Publication Data
US 2018/0206126 A1    Jul. 19, 2018

Related U.S. Application Data

(60) Provisional application No. 62/447,058, filed on Jan. 17, 2017.

(51) Int. Cl.
*H04W 16/14* (2009.01)
*H04L 5/14* (2006.01)
(Continued)

(52) U.S. Cl.
CPC ........... *H04W 16/14* (2013.01); *H04L 5/0092* (2013.01); *H04L 5/14* (2013.01); *H04L 5/1469* (2013.01);
(Continued)

(58) Field of Classification Search
CPC ....... H04L 1/1887; H04L 5/0064; H04L 5/14; H04L 5/1469; H04W 16/14; H04W 28/26;
(Continued)

(56) References Cited

U.S. PATENT DOCUMENTS 9,232,502 B2 * 1/2016 Zhu .................. H04W 74/0816
9,420,472 B2 * 8/2016 Chen ..................... H04W 16/14
(Continued)

FOREIGN PATENT DOCUMENTS

CN    107318171 A  * 11/2017 ............ H04W 72/04
CN    107926039 A  *  4/2018 ............ H04W 72/04
(Continued)

OTHER PUBLICATIONS

International Search Report and Written Opinion—PCT/US2017/063320—ISA/EPO—dated Feb. 13, 2018.

*Primary Examiner* — Eric Nowlin
(74) *Attorney, Agent, or Firm* — Haynes and Boone, LLP

(57) ABSTRACT

Wireless communications systems and methods related to dynamic time-division duplexing (TDD) and self-contained subframe-based communications in a shared spectrum are provided. A first wireless communication device communicates a control information communication protection request over a shared spectrum. The shared spectrum is shared by a plurality of network operating entities based on priorities. The first wireless communication device is associated with a first network operating entity of the plurality of network operating entities. The first wireless communication device communicates, with a second wireless communication device associated with the first network operating entity, control information in a first link direction during a transmission opportunity (TXOP) in the shared spectrum. The first wireless communication device communicates, with the (Continued)

second wireless communication device, data in a second link direction during the TXOP.

30 Claims, 9 Drawing Sheets

(51) Int. Cl.
*H04W 72/04* (2009.01)
*H04W 74/00* (2009.01)
*H04W 74/02* (2009.01)
*H04W 74/08* (2009.01)
*H04L 5/00* (2006.01)

(52) U.S. Cl.
CPC ... *H04W 72/0406* (2013.01); *H04W 72/0446* (2013.01); *H04W 74/002* (2013.01); *H04W 74/02* (2013.01); *H04W 74/0816* (2013.01); *H04L 5/0064* (2013.01)

(58) Field of Classification Search
CPC ......... H04W 72/0406; H04W 72/0446; H04W 72/0453; H04W 72/121; H04W 72/14; H04W 74/002; H04W 74/02; H04W 74/0808; H04W 74/0816
See application file for complete search history.

(56) References Cited

U.S. PATENT DOCUMENTS

| | | | | |
|---|---|---|---|---|
| 9,913,171 | B2* | 3/2018 | Seo | H04W 24/10 |
| 9,936,393 | B2* | 4/2018 | Pao | H04W 72/1226 |
| 10,021,573 | B2* | 7/2018 | Chou | H04W 16/14 |
| 10,028,151 | B2* | 7/2018 | Chandrasekhar | H04W 74/0816 |
| 10,123,358 | B2* | 11/2018 | Fakoorian | H04W 16/14 |
| 10,178,667 | B2* | 1/2019 | Kim | H04W 28/26 |
| 10,194,432 | B2* | 1/2019 | Dinan | H04W 72/042 |
| 10,212,636 | B2* | 2/2019 | Damnjanovic | H04W 36/24 |
| 2009/0310692 | A1* | 12/2009 | Kafle | H04L 5/0007 375/260 |
| 2014/0086212 | A1* | 3/2014 | Kafle | H04B 17/345 370/331 |
| 2014/0119288 | A1* | 5/2014 | Zhu | H04W 72/0406 370/329 |
| 2014/0185497 | A1* | 7/2014 | Wolf | H04W 28/26 370/294 |
| 2014/0341018 | A1 | 11/2014 | Bhushan et al. | |
| 2015/0092758 | A1* | 4/2015 | Chen | H04W 16/14 370/336 |
| 2016/0021664 | A1* | 1/2016 | Chou | H04W 52/0229 370/329 |
| 2016/0095114 | A1* | 3/2016 | Kim | H04W 74/0816 370/329 |
| 2016/0174095 | A1* | 6/2016 | Damnjanovic | H04W 36/24 370/252 |
| 2016/0212625 | A1 | 7/2016 | Damnjanovic et al. | |
| 2016/0234841 | A1* | 8/2016 | Pao | H04W 72/1226 |
| 2016/0302076 | A1* | 10/2016 | Chou | H04W 16/14 |
| 2016/0330678 | A1* | 11/2016 | Yoon | H04L 5/00 |
| 2017/0013470 | A1 | 1/2017 | Sun et al. | |
| 2017/0041805 | A1* | 2/2017 | Chandrasekhar | H04W 74/0816 |
| 2017/0048857 | A1* | 2/2017 | Vajapeyam | H04W 72/1284 |
| 2017/0111217 | A1* | 4/2017 | Kim | H04L 5/001 |
| 2017/0171781 | A1* | 6/2017 | Seo | H04W 24/10 |
| 2017/0223677 | A1* | 8/2017 | Dinan | H04W 72/042 |
| 2017/0230970 | A1* | 8/2017 | Kim | H04W 28/26 |
| 2017/0251442 | A1* | 8/2017 | Kalhan | H04J 11/0069 |
| 2017/0272981 | A1* | 9/2017 | Pao | H04W 28/26 |
| 2018/0007674 | A1* | 1/2018 | Shimomura | H04W 72/044 |
| 2018/0027418 | A1* | 1/2018 | Li | H04W 16/14 370/329 |
| 2018/0139617 | A1* | 5/2018 | Belghoul | H04W 16/14 |
| 2018/0184463 | A1* | 6/2018 | Fakoorian | H04W 16/14 |
| 2018/0199369 | A1* | 7/2018 | Larsson | H04W 74/006 |
| 2018/0219667 | A1* | 8/2018 | Zhao | H04L 5/001 |
| 2018/0220305 | A1* | 8/2018 | Lei | H04L 5/0053 |
| 2018/0263056 | A1* | 9/2018 | Oh | H04W 74/08 |
| 2018/0270860 | A1* | 9/2018 | Bhorkar | H04W 72/0406 |
| 2018/0288625 | A1* | 10/2018 | Chandrasekhar | H04W 74/0816 |
| 2018/0302915 | A1* | 10/2018 | Einhaus | H04W 72/1215 |
| 2018/0310334 | A1* | 10/2018 | Mukherjee | H04L 5/0053 |
| 2018/0367282 | A1* | 12/2018 | Li | H04L 5/0044 |
| 2019/0037584 | A1* | 1/2019 | Park | H04W 16/14 |
| 2019/0053222 | A1* | 2/2019 | Bhorkar | H04W 16/14 |
| 2019/0053242 | A1* | 2/2019 | Akula | H04L 5/001 |
| 2019/0059085 | A1* | 2/2019 | Sun | H04L 5/0053 |
| 2019/0069303 | A1* | 2/2019 | Yerramalli | H04W 72/0413 |
| 2019/0082465 | A1* | 3/2019 | Yoshimoto | H04W 84/10 |
| 2019/0090161 | A1* | 3/2019 | Fan | H04W 28/26 |
| 2019/0090279 | A1* | 3/2019 | Sun | H04W 74/0816 |
| 2019/0098605 | A1* | 3/2019 | Seo | H04W 72/02 |
| 2019/0104514 | A1* | 4/2019 | Chendamarai Kannan | H04L 5/0048 |
| 2019/0104521 | A1* | 4/2019 | Kim | H04W 28/26 |
| 2019/0104547 | A1* | 4/2019 | Xue | H04W 74/0808 |
| 2019/0116591 | A1* | 4/2019 | Yerramalli | H04W 72/0446 |
| 2019/0124689 | A1* | 4/2019 | Yang | H04W 74/08 |
| 2019/0132103 | A1* | 5/2019 | Yang | H04W 72/12 |
| 2019/0150088 | A1* | 5/2019 | Sun | H04W 52/0229 |
| 2019/0150198 | A1* | 5/2019 | Sun | H04L 1/0068 |
| 2019/0159096 | A1* | 5/2019 | Damnjanovic | H04W 36/24 |
| 2019/0159187 | A1* | 5/2019 | Dinan | H04W 72/042 |

FOREIGN PATENT DOCUMENTS

| | | | | |
|---|---|---|---|---|
| EP | 3220708 A1 * | 9/2017 | | H04W 28/26 |
| WO | WO-2017033788 A1 * | 3/2017 | | H04W 72/04 |
| WO | WO-2017185998 A1 * | 11/2017 | | H04W 72/04 |

* cited by examiner

DYNAMIC TIME-DIVISION DUPLEXING (TDD) IN NEW RADIO-SPECTRUM SHARING (NR-SS) AND SELF-CONTAINED SUBFRAME STRUCTURE

CROSS REFERENCE TO RELATED APPLICATIONS

The present application claims priority to and the benefit of the U.S. Provisional Patent Application No. 62/447,058, filed Jan. 17, 2017, which is hereby incorporated by reference in its entirety as if fully set forth below and for all applicable purposes.

TECHNICAL FIELD

This application relates to wireless communication systems, and more particularly to dynamic time-division duplexing (TDD) and self-contained subframe-based communications in a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities.

One approach to reducing medium-sensing signaling overheads is to employ a priority-based coordinated access scheme for spectrum sharing. In a priority-based coordinated access scheme, a shared spectrum is partitioned into multiple time periods. Each time period is designated for a particular type of access. For example, a time period can be allocated to a particular network operator for exclusive access of the shared spectrum, where no reservation from the particular network operator is required. Alternatively, a time period can be shared among multiple network operators on a priority basis with reservations. For example, a high priority network operator may have priority or guaranteed access of the shared spectrum in a time period, but requires a prior reservation of the time period. When the high priority network operator does not reserve the time period, a low priority network operator can opportunistically access the shared spectrum in the time period.

In addition to prioritizing access from different network operators, the scheme can prioritize access for different link directions within a network operator. While the scheme allows for dynamic TDD, where a link priority can be changed from a default link direction, the scheme may not account for communications using self-contained subframes, where each self-contained subframe includes downlink (DL) control information, DL or uplink (UL) data, and UL control information. Accordingly, improved procedures for spectrum sharing with dynamic TDD and self-contained subframe-based communication support are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device, a control information communication protection request over a shared spectrum, wherein the shared spectrum is shared by a plurality of network operating entities based on priorities, and wherein the first wireless communication device is associated with a first network operating entity of the plurality of network operating entities; communicating, by the first wireless communication device with a second wireless communication device associated with the first network operating entity, control information in a first link direction during a transmission opportunity (TXOP) in the shared spectrum; and communicating, by the first wireless communication device with the second wireless communication device, data in a second link direction during the TXOP.

In an additional aspect of the disclosure, an apparatus includes a transceiver configured to communicate a control information communication protection request over a shared spectrum, wherein the shared spectrum is shared by a plurality of network operating entities based on priorities, and wherein the apparatus is associated with a first network operating entity of the plurality of network operating entities; communicate, with a second wireless communication device associated with the first network operating entity, control information in a first link direction during a transmission opportunity (TXOP) in the shared spectrum; and communicate, with the second wireless communication device, data in a second link direction during the TXOP.

In an additional aspect of the disclosure, a computer-readable medium having program code recorded thereon, the program code includes code for causing a first wireless communication device to communicate a control information communication protection request over a shared spectrum, wherein the shared spectrum is shared by a plurality of network operating entities based on priorities, and wherein the first wireless communication device is associated with a first network operating entity of the plurality of network operating entities; code for causing the first wireless communication device to communicate, with a second wireless communication device associated with the first network operating entity, control information in a first link direction during a transmission opportunity (TXOP) in the shared spectrum; and code for causing the first wireless communication device to communicate, with the second wireless communication device, data in a second link direction during the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
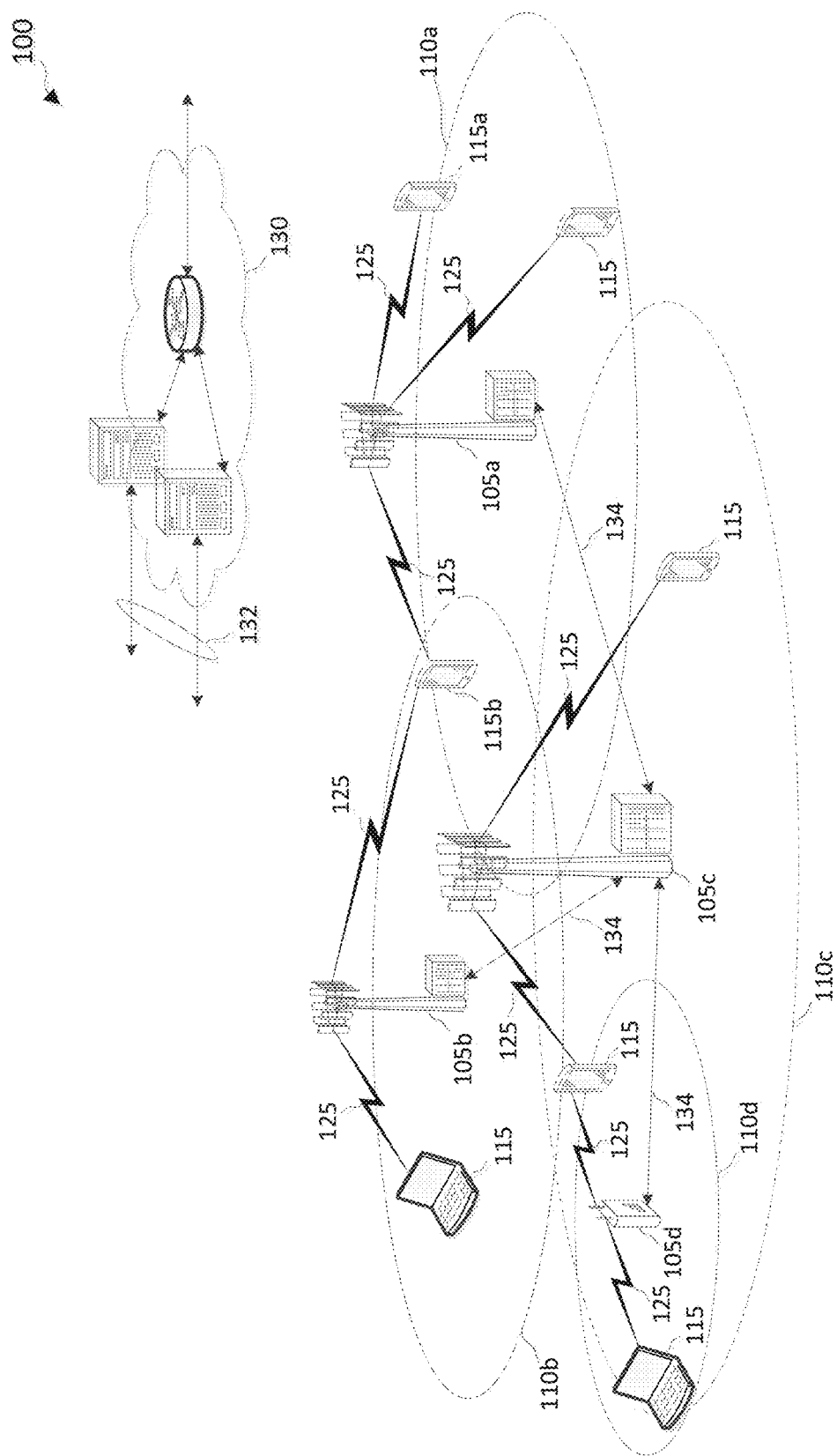
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for dynamic TDD and self-contained subframe-based communications in a spectrum shared by multiple network operating entities. In a priority-based spectrum sharing scheme, a spectrum is time-partitioned into transmission opportunities (TXOPs). Each TXOP is designated for prioritized use by a prioritized or high priority network operating entity and opportunistic use by low priority network operating entities based on reservations. To enable fast feedback and/or link adaptation, the TXOPs can be configured as self-contained TXOPs including a DL control portion, an UL data or DL data portion, and an UL control portion. For example, a granting BS can transmit a reservation request (RRQ) signal to reserve a TXOP. A target data receiver can transmit a reservation response (RRS) signal to protect data reception at the target data receiver from low priority nodes around the target data receiver. Since data and control can be of different link directions, a target control receiver can also transmit an RRS signal to protect control information reception at the target control receiver from low priority nodes around the target control receiver. In an embodiment, a TXOP can include multiple self-contained subframes. The TXOP can include a common sensing period for multiple nodes to transmit an RRS signal to protect control information communication. Each self-contained subframe can include a sensing period for a target data receiver to transmit an RRS signal to protect data communication in the self-contained subframe.

Aspects of the present disclosure can provide several benefits. For example, the protections of both data communication and control information communication can improve spectrum sharing or resource utilization efficiency. The use of per self-contained subframe RRS transmission allows for dynamic TDD support at a subframe-level. The disclosed embodiments are suitable for use in coverage areas including macro cells and small cells. The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes an UL subframe in an UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. AN UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
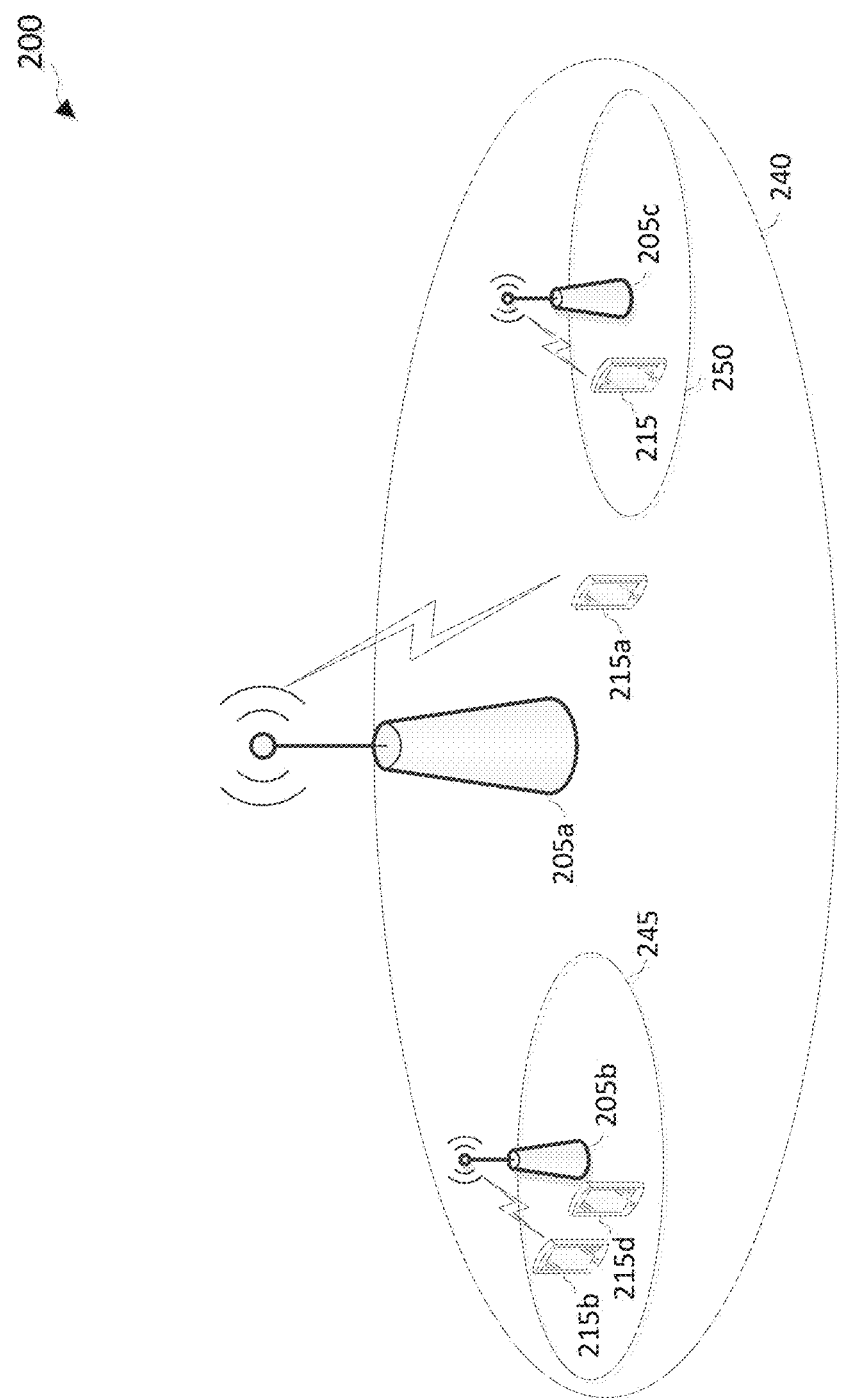
FIG. 2 illustrates an example of a wireless communications network that supports priority-based spectrum sharing according to embodiments of the present disclosure.

FIG. 2 illustrates an example of a wireless communications network 200 that supports priority-based spectrum sharing according to embodiments of the present disclosure. The network 200 may be similar to the network 100. FIG. 2 illustrates three BSs 205 and four UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The BS 205a serves the UE 215a in a macro cell 240. The BS 205b serves the UEs 215b and 215d in a pico cell 245 within a coverage area of the macro cell 240. The BSs 205c serves the UE 215c in another pico cell 250 within the coverage area of the macro cell 240. The BSs 205 and the UEs 215 may communicate over the same spectrum.

Due to the different transmission power requirements or power-classes of nodes (e.g., the BSs 205 and the UEs 215) in the macro cell 240 and the pico cells 245 and 250, different power-class nodes may be treated as different network operating entities and assigned with different priorities for sharing the spectrum to minimize interference. For example, the BS 205a and the UE 215a may be treated as one network operating entity (e.g., Operator A), the BS 205b and 205c and the UEs 215b-d may be treated as another network operating entity (e.g., Operator B). In the present disclosure, the terms network operating entity and operator may be used interchangeably and may be associated with a particular priority and/or a particular power class.

The spectrum may be partitioned by classifying time resources into periods and assigning the periods to different network operating entities. In some embodiments, certain time periods may be allocated for exclusive use by a particular network operating entity. Other time periods may be allocated for prioritized use or guaranteed use by a particular network operating entity, but may also be for opportunistic use by the other network operating entities. In yet other examples, certain time periods may be designated for opportunistic use by all network operating entities, for example, to enable additions of network operating entities into the network 200 in a non-centralized manner. The claiming of the time periods for prioritized use or opportunistic use may be based on reservations. In addition, the BSs 205 and the UEs 215 may communicate using self-contained subframes over the shared spectrum and/or perform dynamic TDD to switch a link direction over the shared spectrum, as described in greater detail herein.

Figure 3:
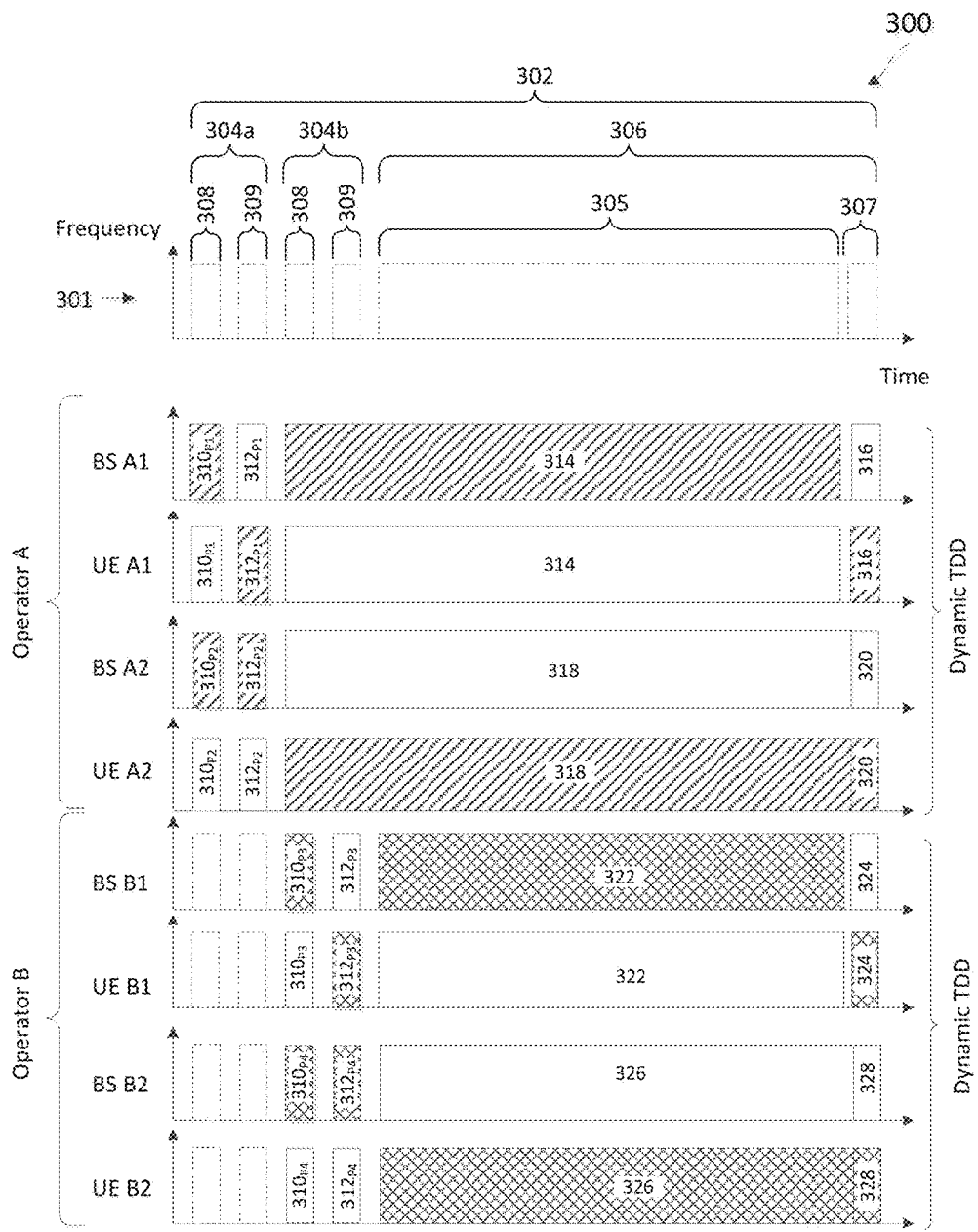
FIG. 3 illustrates a priority-based spectrum sharing scheme with dynamic TDD support according to embodiments of the present disclosure.

FIG. 3 illustrates a priority-based spectrum sharing scheme 300 with dynamic TDD support according to embodiments of the present disclosure. The x-axes represent time in some constant units. The y-axes represent frequency in some constant units. The scheme 300 may be employed by the BSs 105 and 205 and the UEs 115 and 215 to access a shared spectrum. While the scheme 300 illustrates coordinated spectrum access for two different network operating entities (e.g., Operator A and Operator B), the scheme 300 can be applied to any suitable number of network operating entities.

In the scheme 300, the spectrum is time-partitioned into a plurality of transmit opportunities (TXOPs) 302 as shown in the frame structure 301. The TXOPs may have a fixed duration and may be defined in units of OFDM symbols, subframes, slots, and/or any suitable time format. Each TXOP 302 includes a plurality of channel sensing or clear channel assessment (CCA) periods 304 followed by a transmission period 306. The structure 301 of the TXOP 302 is pre-determined and known by all network operating entities sharing the shared spectrum. The network operating entities may be time-synchronized when operating in the shared spectrum.

Each CCA period 304 is assigned to a particular network operating entity (e.g., Operator A or Operator B). The assigned network operating entity may transmit a reservation in the CCA period 304 to reserve the following transmission period 306 for communications. Each CCA period 304 is divided into two portions 308 and 309, for example, for transmitting a reservation request (RRQ) signal 310 and a reservation response (RRS) signal 312, respectively. The CCA periods 304 can be arranged in a decreasing order of priorities. Thus, a low priority operator node can monitor the channel (e.g., the shared spectrum) in the CCA periods 304 of higher priorities. Upon detection of a reservation from a high priority operator node, the low priority operator node may refrain from transmitting in the following transmission period 306.

The transmission period 306 can be used for UL and/or DL transmissions. For example, the transmission period 306 may include two portions 305 and 307. The portion 305 can have a longer duration than the portion 307. For DL-centric communications, the portion 305 can be used for DL data transmission and the portion 307 can be used for UL control transmission. Alternatively, for UL-centric communications, the portion 305 can be used for UL data transmission and the portion 307 can be used for UL control transmission.

As an example, Operator A has priority over Operator B in the particular TXOP 302. As such, the high-priority CCA period 304a is assigned to Operator A and the low-priority CCA period 304b is assigned to Operator B. Thus, Operator A nodes has prioritized access in the transmission period 306, while Operator B nodes may opportunistically access the transmission period 306 when the transmission period 306 is not reserved by Operator A nodes. For example, Operator A includes BSs A1 and A2 and UEs A1 and A2 similar to the BS 205a and UE 215a, respectively. Operator B includes BSs B1 and B2 and UEs B1 and B2 similar to the BSs 205b and UEs 215b. In addition, the default link direction is DL within Operator A and within Operator B during the TOXP 302. Thus, the transmission priorities in order are Operator A DL (e.g., priority P1), Operator A UL (e.g., priority P2), Operator B DL (e.g., priority P3), and Operator B UL (e.g., priority P4). The patterned boxes represent transmit signals and the empty boxes represent receive signals. The dashed boxes are included as references to the structure of the TXOP frame structure 301 without signal transmission or reception.

For prioritized access, the BS A1 may transmit a RRQ signal $310_{P1}$ in the portion 308 of the CCA period 304a to reserve the following transmission period 306, for example, for a DL-centric transmission. In response, the UE A1 (e.g., the target receiver) may transmit an RRS signal $312_{P1}$ in the portion 309 of the CCA period 304a. The RRQ signal $310_{P1}$ can be a pre-determined preamble or a request-to-send (RTS) signal. Similarly, the RRS signal $312_{P1}$ can be a pre-determined preamble or a clear-to-send (CTS) signal. In some embodiments, the RRQ signal $310_{P1}$ can be a DL transmission trigger (e.g., including scheduling information) and the RRS signal $312_{P1}$ can be a SRS for channel sounding. The BSs A2, B1, and B2 and UEs A2, B1, and B2 may monitor the CCA period 304a for a RRQ and/or an RRS signal. Upon detection of the RRQ signal $310_{P1}$ and/or the RRS signal $312_{P1}$, the BSs A2, B1, and B2 and UEs A2, B1, and B2 may yield spectrum access to the BS A1.

Subsequently, the BS A1 may communicate with the UE A1 in the transmission period 306. In some embodiments, the transmission period 306 may begin after the CCA period 304a (e.g., occupying the low-priority CCA period 304b). The BS A1 may transmit a DL data signal 314 during the portion 305 of the transmission period 306. The DL data signal 314 may carry DL data destined for the UE A1. The UE A1 may transmit an UL control signal 316, for example, carrying scheduling request (SR) and hybrid automatic repeat request (HARQ) information, during the portion 307 of the transmission period 306.

As can be seen, the transmission of the RRS signal $312_{P1}$ by the UE A1 can silence low priority nodes close to the UE A1, and thus protects the reception of the DL data signal 314. Since the target receiver of the UL control signal 316 is the BS A1, the reception of the UL control signal 316 at the BS A1 can be protected by the transmission of the RRQ signal $310_{P1}$, which can silence low priority nodes close to the BS A1.

For dynamic TDD within Operator A, the BS A2 may transmit a RRQ signal $310_{P2}$, for example, at the same time as the RRQ signal $310_{P1}$ during the portion 308 of the CCA period 304a based on reuse one. The RRQ signal $310_{P2}$ may indicate an UL grant for the UE A2. The UE A2 may monitor for an RRS signal $312_{P1}$ for the priority link (e.g., the DL) in the portion 309 of the CCA period 304a. When no RRS signal $312_{P1}$ is detected, the UE A2 may dynamically switch the link priority to UL and transmit an UL data signal 318 and an UL control signal 320 to the BS A2 during the transmission period 306. When there are low priority operator nodes, the BS A2 (e.g., the target receiver) may transmit an RRS signal $312_{P2}$ during the portion 309 of the CCA period 304a to silence low priority nodes near the BS A2.

For opportunistic access by Operator B, the BS B1 and the UE B1 may listen for a reservation from high priority operator nodes (e.g., the BSs A1 and A2 and the UEs A1 and A2) in the CCA period 304a. When no reservation is detected, the BS B1 may access the TXOP 302 using similar mechanisms as the BSs A1 and A2. For example, the BS B1 sends a RRQ signal $310_{P3}$ in the portion 308 of the CCA period 304b. The UE A1 may send an RRS signal $312_{P3}$ in the portion 309 of the CCA period 304b. Subsequently, the BS B1 may communicate with the UE B1 in the transmission period 306 as shown by a DL data signal 322 and an UL control signal 324.

Dynamic TDD within Operator B may be performed using similar mechanisms as the dynamic TDD within Operator A. For example, the BS B2 may transmit a RRQ signal $310_{P4}$ in the portion 308 of the CCA period 304b. The RRQ signal $310_{P4}$ may indicate an UL grant for the UE B2. The transmission of the RRQ signal $310_{P3}$ and the RRQ signal $310_{P4}$ are based on reuse one. The UE B2 may monitor for an RRS signal $312_{P3}$ for the priority link (e.g., the DL) in the portion 309 of the CCA period 304b. When no RRS signal $312_{P3}$ is detected, the UE B2 may dynamically switch the link priority to UL and transmit an UL data signal 326 and an UL control signal 328 to the BS A2. When Operator B has the lowest priority, the BS B2 may not be required to send an RRS signal $312_{P4}$.

Figure 4:
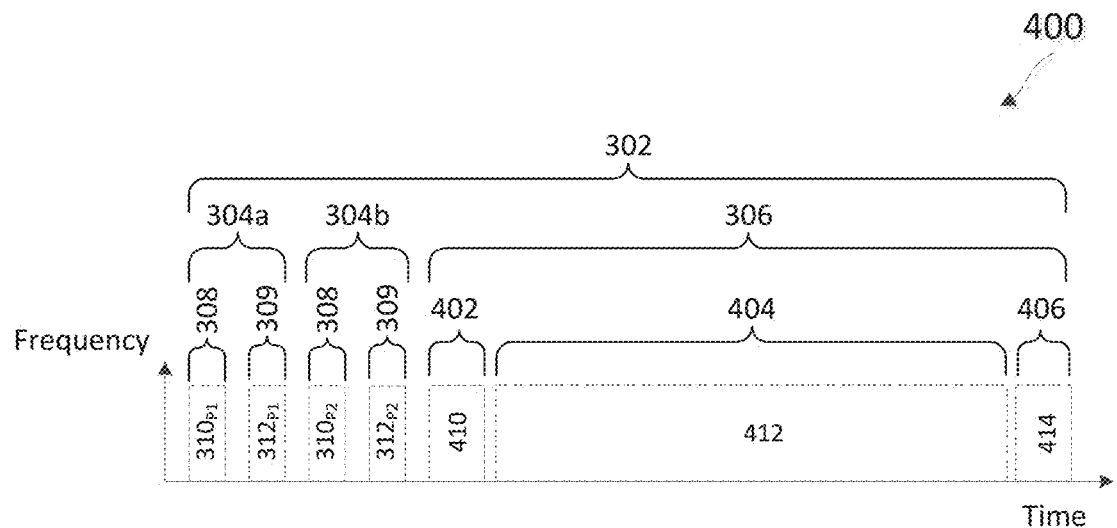
FIG. 4 illustrates a self-contained TXOP structure according to embodiments of the present disclosure.

FIG. 4 illustrates a self-contained TXOP structure 400 according embodiments of the present disclosure. The x-axis represents time in some constant units. The y-axis represents frequency in some constant units. The structure 400 can be employed by the scheme 300 in place of the structure 301. The structure 400 is similar to the structure 301, but divides the transmission period 306 into three portions 402, 404, and 406. The portion 402 is for transmitting DL control information 410. The portion 402 is used for transmitting data 412 in an UL direction or a DL direction. The portion 406 is used for transmitting UL control information 414. The inclusion of the DL control information 410 at the beginning portion 402 of the transmission period 306 and the UL control information 414 at the end portion 406 of the transmission period 306 can provide a fast feedback, a short round trip delay (RTT), and a fast link adaption.

As described above, the scheme 300 can protect data communication in a transmission period 306 from low priority nodes. The scheme 300 may perform well with the structure 400 when the portion 404 is used for DL data communication, where a receiving UE transmits an RRS signal 312. The RRS signal 312 can protect the reception of both the DL control information 410 and the DL data 412 at the UE. The reception of the UL control information 414 at the BS can be protected by the transmission of the RRQ signal 310.

However, the scheme 300 may not perform well with the structure 400 when the portion 404 is used for UL data communication, where a granting BS transmits an RRS signal 312. The RRQ signal 310 and/or RRS signal 312 can protect the reception of the UL data 412 and the UL control information 414 at the BS. However, the DL control information 410 is communicated over a different link direction than the UL data 412 and the UL control information 414. Thus, the DL control information 410 can experience interference from low priority nodes.

Figure 5:
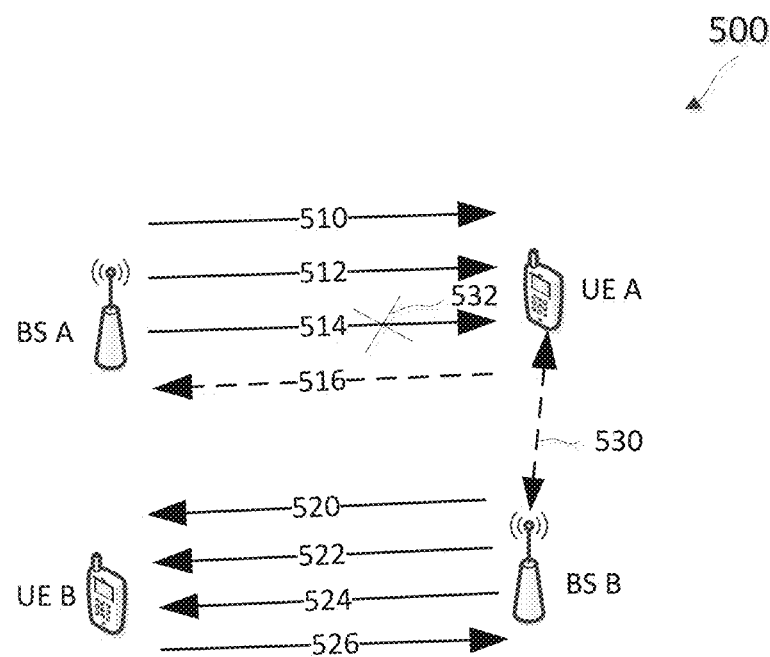
FIG. 5 illustrates an interference scenario according to embodiments of the present disclosure.

FIG. 5 illustrates an interference scenario 500 according to embodiments of the present disclosure. The scenario 500 illustrates interference on DL control information using the scheme 300 with the self-contained TXOP structure 400. In the scenario 500, Operator A (e.g., BS A and UE A) has priority over Operator B (e.g., BS B and UE B) in a particular TXOP 302. The BSs A and B are similar to the BSs 105 and 205. The UEs A and B are similar to the UEs 115 and 215. As shown, the BS B is positioned close to the UE A and far away from the BS A. Thus, the BS B and the UE A can interfere with each other and the BS B may not hear transmissions from the BS A.

At step 510, the BS A may transmit a RRQ signal $310_{P1}$ during the CCA period 304a to reserve the TXOP 302 for UL communication with the UE A. At step 512, the BS A (e.g., the target receiver) may transmit an RRS signal $312_{P1}$ during the CCA period 304a. At step 514, the BS A may transmit a first DL control signal during the portion 402 of the transmission period 306. The first DL control signal carries an UL grant for the UE A. At step 516, if the UE A receives and decodes the first DL control signal (e.g., the DL control information 410) correctly, the UE A may transmit a first UL data signal (e.g., the data 412) to the BS A during the portion 404 of the transmission period 306.

Since the BS B is far away from the BS A, the BS B may not detect the RRQ signal $310_{P1}$ and RRS signal $312_{P1}$ transmitted by the BS A. Thus, at step 520, the BS B may proceed to transmit a RRQ signal $310_{P2}$ during the CCA period 304b to the UE B to reserve the TXOP 302 for UL communication with the UE B. At step 522, the BS B may transmit an RRS signal $312_{P2}$ during the CCA period 304b. At step 524, the BS B may transmit a second DL control signal during the same portion 402 of the transmission period 306. The second DL control signal carries an UL grant for the UE B. At step 526, the UE B may transmit a second UL data signal to the BS B during the portion 404 of the transmission period 306.

For example, the UE B's UL data signal transmission does not reach the BS A. Thus, the BS A may receive the first UL data signal from the UE A with a receive signal strength strong enough for decoding. However, the second DL control signal transmitted from the BS B can interfere with the reception of the first DL control signal at the UE A as shown by the arrow 530 and causes the UE A to miss the UL grant as shown by the cross 532. The miss reception or detection of the UL grant can cause resource utilization inefficiency. This problem occurs since UE A did not transmit any RRS signal to silence low priority nodes (e.g., the BS B) near the UE A. Thus, the self-contained TXOP structure 400 requires protections for both the data link and the control link.

Figure 6:
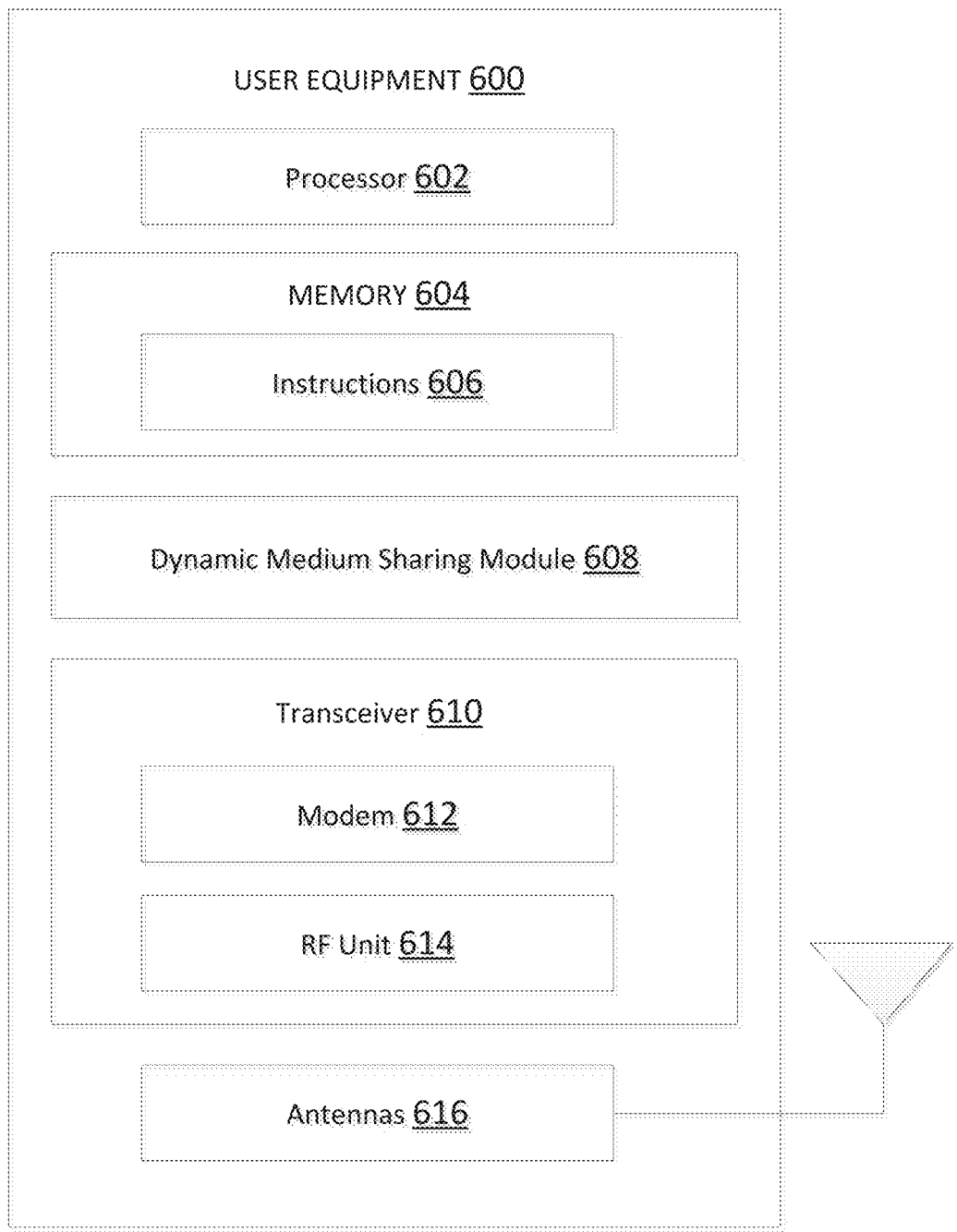
FIG. 6 is a block diagram of an exemplary user equipment (UE) according to embodiments of the present disclosure.

FIG. 6 is a block diagram of an exemplary UE 600 according to embodiments of the present disclosure. The UE 600 may be a UE 115 or 215 as discussed above. As shown, the UE 600 may include a processor 602, a memory 604, a dynamic medium sharing module 608, a transceiver 610 including a modem subsystem 612 and a radio frequency (RF) unit 614, and an antenna 616. These elements may be in direct or indirect communication with each other, for example via one or more buses.

The processor 602 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 604 includes a non-transitory computer-readable medium. The memory 604 may store instructions 606. The instructions 606 may include instructions that, when executed by the processor 602, cause the processor 602 to perform the operations described herein with reference to the UEs 215 in connection with embodiments of the present disclosure. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The dynamic medium sharing module 608 may be used for various aspects of the present disclosure. For example, the dynamic medium sharing module 608 is configured to identify TXOPs in a shared spectrum, perform network listening, reserve time periods for communication, send protection requests to protect data communication, send protection requests to protect control information communication, and/or perform dynamic TDD, as described in greater detail herein.

As shown, the transceiver 610 may include the modem subsystem 612 and the RF unit 614. The transceiver 610 can be configured to communicate bi-directionally with other devices, such as the BSs 105 and 205. The modem subsystem 612 may be configured to modulate and/or encode the data from the memory 604 and/or the dynamic medium sharing module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 215 or a BS 205. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 215 to enable the UE 215 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of clear-to-send (CTS) signals according to embodiments of the present disclosure. The antenna 616 may further receive data messages transmitted from other devices. This may include, for example, reception of request-to-send (RTS) and/or CTS signals according to embodiments of the present disclosure. The antenna 616 may provide the received data messages for processing and/or demodulation at the transceiver 610. Although FIG. 6 illustrates antenna 616 as a single antenna, antenna 616 may include multiple antennas of similar or different designs in order to sustain multiple transmission links. The RF unit 614 may configure the antenna 616.

Figure 7:
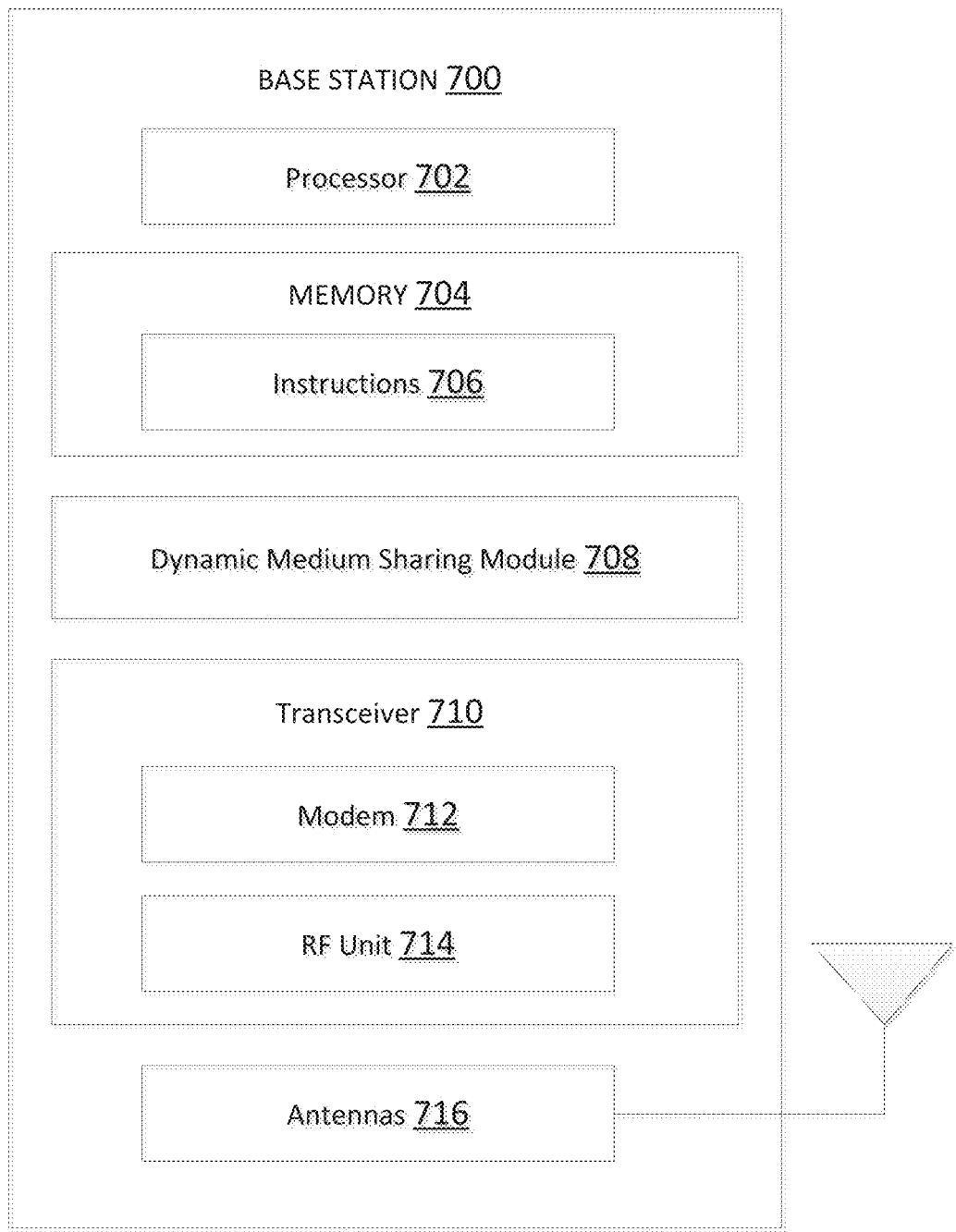
FIG. 7 is a block diagram of an exemplary base station (BS) according to embodiments of the present disclosure.

FIG. 7 is a block diagram of an exemplary BS 700 according to embodiments of the present disclosure. The BS 700 may be a BS 105 or 205 as discussed above. A shown, the BS 700 may include a processor 702, a memory 704, a dynamic medium sharing module 708, a transceiver 710 including a modem subsystem 712 and a RF unit 714, and an antenna 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 704 may include a non-transitory computer-readable medium. The memory 704 may store instructions 706. The instructions 706 may include instructions that, when executed by the processor 702, cause the processor 702 to perform operations described herein. Instructions 706 may also be referred to as code, which may be interpreted broadly to include any type of computer-readable statement(s) as discussed above with respect to FIG. 7.

The dynamic medium sharing module 708 may be used for various aspects of the present disclosure. For example, the dynamic medium sharing module 708 is configured to identify TXOPs in a shared spectrum, perform network listening, reserve time periods for communication, send protection requests to protect data communication, send protection requests to protect control information communication, and/or perform dynamic TDD, as described in greater detail herein.

As shown, the transceiver 710 may include the modem subsystem 712 and the RF unit 714. The transceiver 710 can be configured to communicate bi-directionally with other devices, such as the UEs 115 and 215 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 215. The RF unit 714 may be further configured to perform analog beamforming in conjunction with the digital beamforming. Although shown as integrated together in transceiver 710, the modem subsystem 712 and the RF unit 714 may be separate devices that are coupled together at the BS 205 to enable the BS 205 to communicate with other devices.

The RF unit 714 may provide the modulated and/or processed data, e.g. data packets (or, more generally, data messages that may contain one or more data packets and other information), to the antenna 716 for transmission to one or more other devices. This may include, for example, transmission of information to complete attachment to a network and communication with a camped UE 215 according to embodiments of the present disclosure. The antenna 716 may further receive data messages transmitted from other devices and provide the received data messages for processing and/or demodulation at the transceiver 710. Although FIG. 7 illustrates antenna 716 as a single antenna, antenna 716 may include multiple antennas of similar or different designs in order to sustain multiple transmission links.

Figure 8:
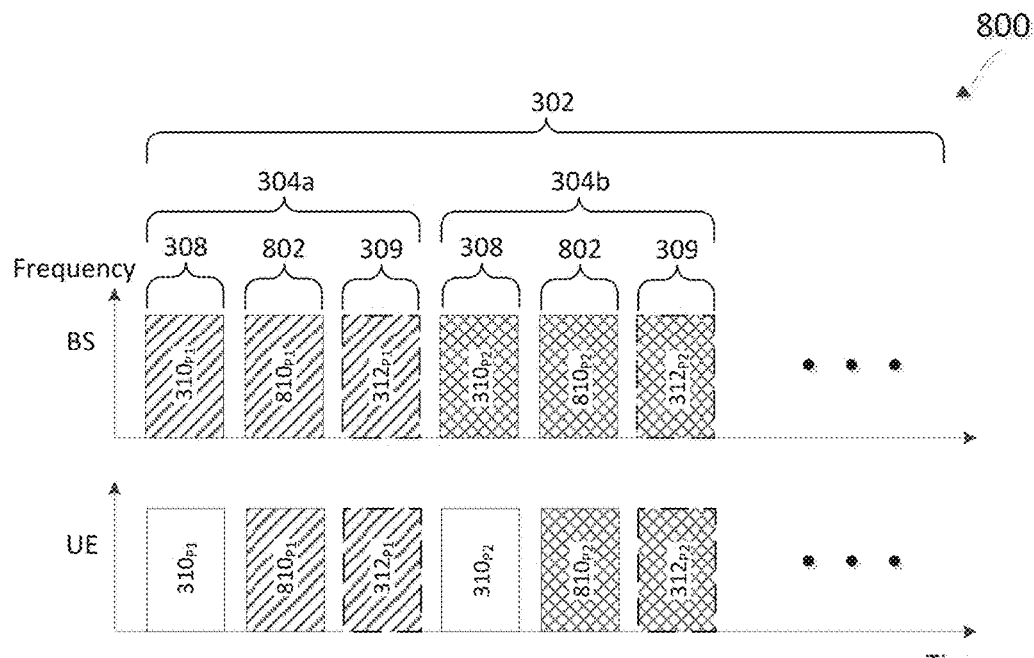
FIG. 8 illustrates a spectrum sharing scheme that provides control information and data protection according to embodiments of the present disclosure.
Figure 9:
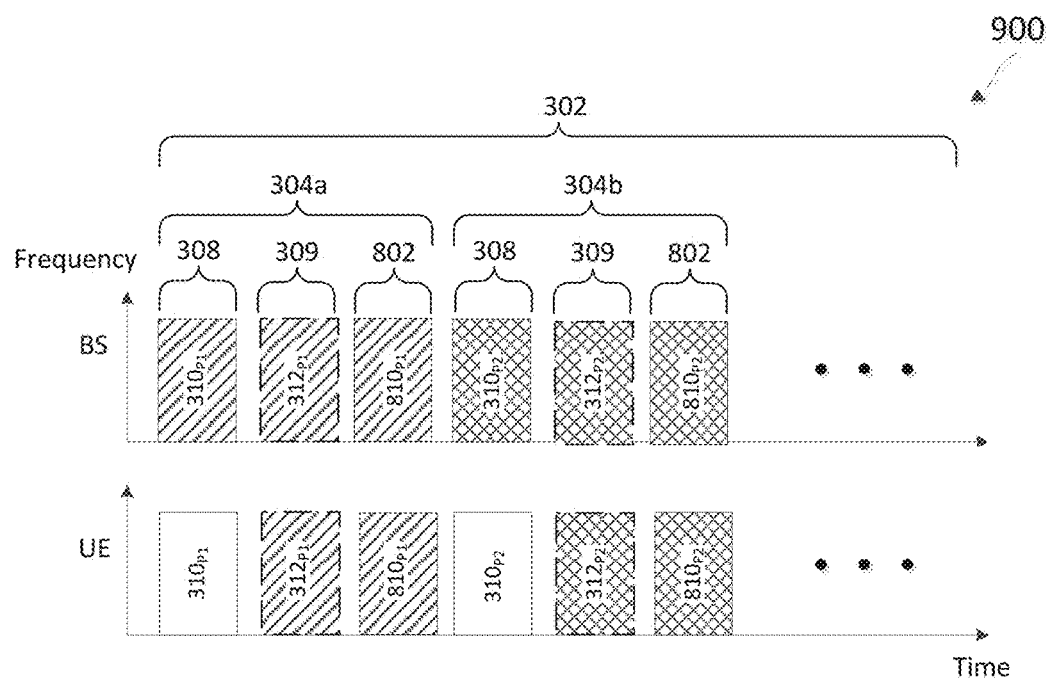
FIG. 9 illustrates a spectrum sharing scheme that provides control information and data protection according to embodiments of the present disclosure.
Figure 10:
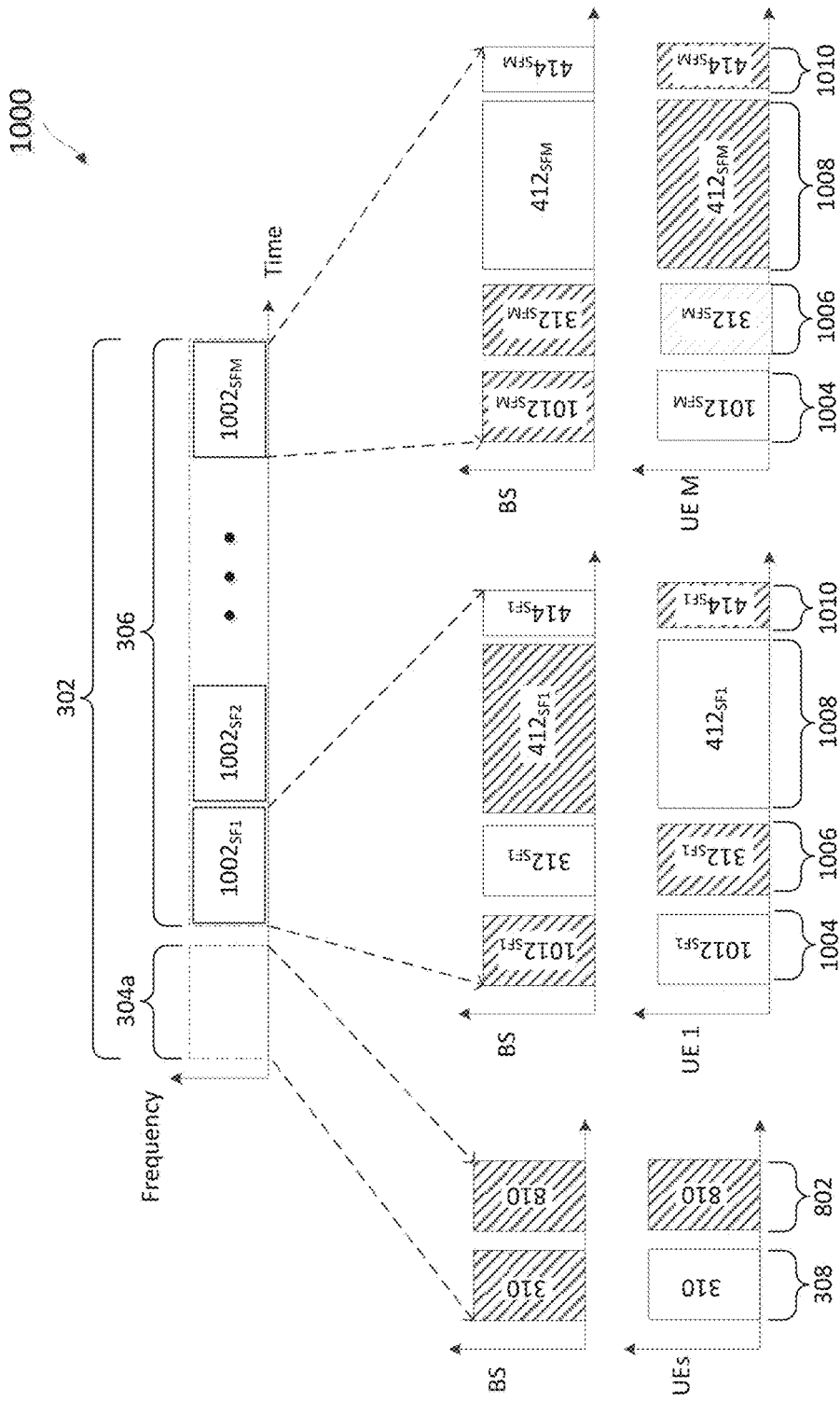
FIG. 10 illustrates a spectrum sharing scheme that provides control information and data protection according to embodiments of the present disclosure.

FIGS. 8-10 illustrate various spectrum sharing mechanisms that may be employed by the BSs 105, 205, and 700 and the UEs 115, 215, and 600 to protect data and control information communications. While FIGS. 8-10 illustrate spectrum sharing by two operators (e.g., Operator A and Operator B), for purposes of simplicity of discussion, though it will be recognized that embodiments of the present disclosure may scale to many more UEs and/or BSs. In FIGS. 8-10, the x-axes represent time in some constant units, and the y-axes represent frequency in some constant units.

FIG. 8 illustrates a spectrum sharing scheme 800 that provides control information and data protection according to embodiments of the present disclosure. The scheme 800 may employ similar reservation mechanisms as in the scheme 300. However, in the scheme 800, a target receiver of control information is also required to transmit an RRS signal to protect the reception of the control information. In the scheme 800, each CCA period 304 includes portions 308, 802, and 309. The 308 is designated for a granting BS to transmit a RRQ signal 310. The portion 802 is designated for one or more target control information receivers to transmit an RRS signal 810 to protect control information communication. The RRS signal 810 functions as a protection request. The portion 309 is designated for one or more target data receivers to transmit an RRS signal 312 to protect data communication. The RRS signal 810 and the RRS signal 312 are assigned with different transmission periods (e.g., the portions 802 and 309) since control information and data can be of different links. Thus, some nodes may need to transmit an RRS signal 810 to protect control information and monitor for an RRS signal 312 to determine whether the node can transmit data in a subsequent transmission period 306.

As an example, Operator A has priority over Operator B in the particular TXOP 302. For UL-centric communication, the BS A of Operator A may transmit a RRQ signal $310_{P1}$ in the portion 308 of the CCA period 304a to reserve a subsequent transmission period 306 for UL communication with the UE A. The UE A may transmit an RRS signal $810_{P1}$ in the portion 802 to protect DL control information (e.g., the DL control information 410) in the subsequent transmission period 306. The BS A may transmit an RRS signal $312_{P1}$ in the portion 309 to protect UL data (e.g., the data 412) and UL control information (e.g., the UL control information 414) in the subsequent transmission period 306.

The BS B and the UE B may monitor for a RRQ signal 310, an RRS signal 810, and/or an RRS signal 312 in the CCA period 304a. Upon detecting the RRQ signal $310_{P1}$, an RRS signal $810_{P1}$, and/or an RRS signal $312_{P1}$, the BS B and the UE B yield access to Operator A. However, when no RRQ signal 310, RRS signal 810, or RRS signal 312 is detected, the BS B may transmit a RRQ signal $310_{P2}$ in the portion 308 of the CCA period 304b to reserve a subsequent transmission period 306 for UL communication with the UE B. The UE B may transmit an RRS signal $810_{P2}$ in the portion 802 of the CCA period 304b to protect DL control information (e.g., the DL control information 410) in the subsequent transmission period 306. The BS B may transmit an RRS signal $312_{P2}$ in the portion 309 to protect UL data (e.g., the data 412) and UL control information (e.g., the UL control information 414) in the subsequent transmission period 306.

In an embodiment, a grant BS can always transmit an RRS signal 810 in the portion 802 concurrently with a scheduled UE since all self-contained structure includes UL control information. In some embodiments, the RRQ signal $310_{P1}$ may schedule communications with multiple UEs of Operator A. In such embodiments, the scheduled UEs may transmit the RRS signal $810_{P1}$ simultaneously during the portion 802 of the CCA period 304a. In some other embodiments, a network (e.g., the networks 100 and 200) may semi-statically pre-configure a group of UEs to simultaneously transmit RRS signals 810 during a corresponding portion 802, for example, based on measurements or a jamming graph (e.g., neighboring node information) of the network. The group of UEs may be triggered to transmit the RRS signals 810 based on a RRQ signal 310 or a CRS from a granting BS. The simultaneous transmissions of RRS signal 810 from a group of UEs can result in higher signal strength, and thus may improve protection of the DL control information from low priority nodes.

FIG. 9 illustrates a spectrum sharing scheme 900 that provides control information and data protection according to embodiments of the present disclosure. The scheme 900 is similar to the scheme 800 and may employ similar mechanisms to protect data and control information communications as in the scheme 800. However, the portion 802 used for control information protection is positioned after the portion 309.

FIG. 10 illustrates a spectrum sharing scheme 1000 that provides control information and data protection according to embodiments of the present disclosure. The scheme 1000 is similar to the schemes 800 and 900, but additionally provision for dynamic TDD in a TXOP 302 with multiple self-contained subframes. As shown, the transmission period 306 is divided into multiple self-contained subframes 1002 (e.g., LTE slots). For example, the transmission period 306 may include DL subframes 1002 and UL subframes 1002, for example, based on configuration and/or dynamic TDD. Since the subframes 1002 within a TXOP 302 may include both UL data communications and DL data communications, an RRS signal 312 is used to protect data communication for each subframe 1002.

As shown, each CCA period 304 includes a portion 308 and a portion 802. The portion 308 is designated for a granting BS to transmit a RRQ signal 310. The portion 802 is used by one or more target control information receivers to transmit RRS signals 810 for protecting control information communication in the subframes 1002. Each subframe 1002 includes portions 1004, 1006, 1008, and 1010. The portion 1004 is used by a granting BS to transmit a RRQ signal 1012 (e.g., similar to the DL control information 410) to reserve the subframe 1002 for data communication with a UE. The portion 1006 is used by a target data receiver (e.g., the scheduled UE) to transmit an RRS signal 312 for protecting data communication in the subframe 1002. The portions 1004 and 1006 can be referred to as sensing periods of the subframe 1002. The portion 1008 is used by a granting BS to transmit data 412 in a DL direction or a scheduled UE to transmit data 412 in an UL direction. The portion 1010 is used by a scheduled UE to transmit UL control information 414.

As an example, a BS (e.g., of Operator A) reserves the particular TXOP 302 for communications. The BS may transmit a RRQ signal 310 in the portion 308 of the assigned CCA period 304a. In an embodiment, the RRQ signal 310 may trigger a group of UEs to transmit RRS signals 810. The group of UEs may be triggered based on the schedule for the transmission period 306. Alternatively, the group of UEs is semi-statically configured for RRS signal 810 transmissions. The BS and the triggered UEs may simultaneously transmit RRS signals 810 to protect subsequent control information (e.g., DL control information 410 and UL control information 414) communications in the transmission period 306.

In a first embodiment, the TXOP 302 is configured to include M subframes 1002, where the first M−1 subframes 1002 have a DL priority and the last subframe 1002 has an UL priority. In the first subframe $1002_{SF1}$, the BS may transmit a RRQ signal $1012_{SF1}$ during the portion 1004 to schedule DL data communication with UE 1. The UE 1 may transmit an RRS signal $312_{SF1}$ during the portion 1006 to protect the DL data communication. The BS may transmit DL data $412_{SF1}$ to the UE 1 during the portion 1008. The UE 1 may transmit UL control information $414_{SF1}$ during the portion 1010.

In the last subframe $1002_{SFM}$, the BS may transmit a RRQ signal $1012_{SFM}$ during the portion 1004 to schedule UL data communication with a UE M. The BS may transmit an RRS signal $312_{SFM}$ during the portion 1006 of the subframe $1002_{SFM}$ to protect the UL data communication. The UE M may transmit UL data $412_{SFM}$ to the BS during the portion 1008 of the subframe $1002_{SFM}$. The UE M may transmit UL control information $414_{SFM}$ during the portion 1010 of the subframe $1002_{SFM}$.

In a second embodiment, all subframes 1002 in the TXOP are configured with a DL priority. In the last subframe $1002_{SFM}$, a second BS of the same Operator may transmit a RRQ signal 310 during the portion 1004 indicating an UL grant for another UE, for example, a UE N. The UE N may monitor for an RRS signal 312 in the portion 1006 from the priority link. When there is no RRS signal 312 detected in the portion 1006 from the priority link, the UE N may dynamically switches the link priority from DL to UL and proceed to transmit UL data 412 to the second BS during the portion 1008.

Figure 11:
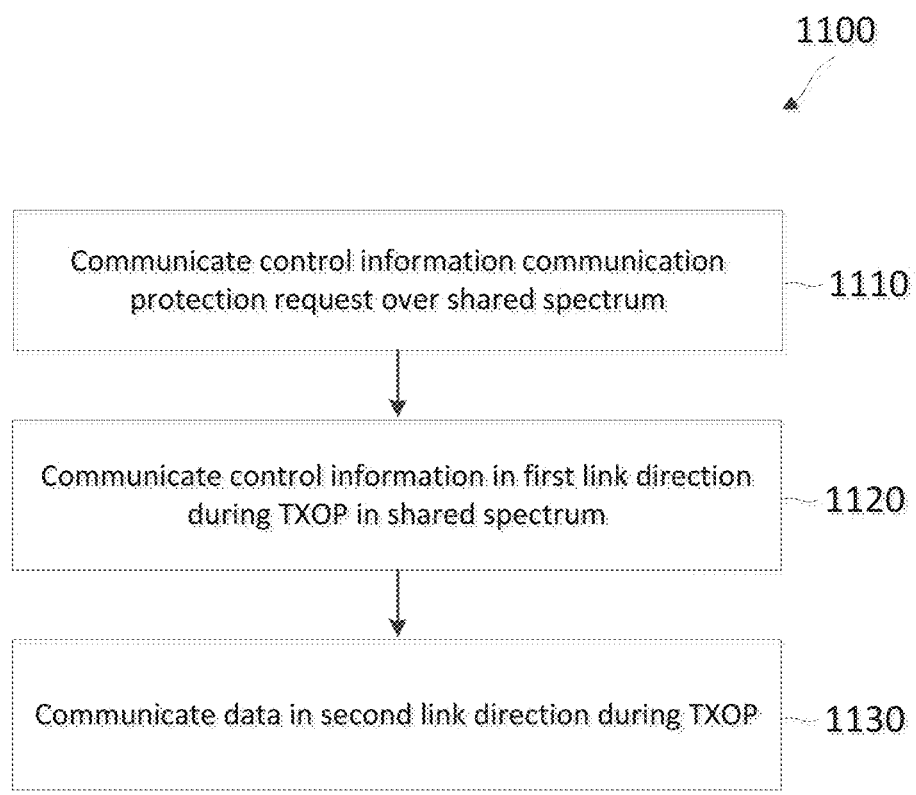
FIG. 11 is a flow diagram of a method of protecting data and control information over a shared spectrum according to embodiments of the present disclosure.

FIG. 11 is a flow diagram of a method 1100 of protecting data and control information over a shared spectrum according to embodiments of the present disclosure. Steps of the method 1100 can be executed by a computing device (e.g., a processor, processing circuit, and/or other suitable component) of a wireless communication device, such as the BSs 105, 205, and 700 and the UEs 115, 215, and 600. The method 1100 may employ similar mechanisms as in the schemes 300, 800, 900, and 1000 described with respect to FIGS. 3, 8, 9, and 10, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes communicate a control information communication protection request (e.g., the RRS signal 810) over a shared spectrum. The shared spectrum is shared by the plurality of network operating entities (e.g., Operator A and Operator B) based on priorities. For example, the wireless communication device (e.g., the BS 205a or the UE 215a) is associated with a first network operating entity (e.g., Operator A) of the plurality of the network operating entities.

At step 1120, the method 1100 includes communicating control information (e.g., the DL control information 410, the RRQ signal 1012, and/or the UL control information 414) in a first link direction with a second wireless communication device (e.g., the UE 215a or the BS 205a) during a TXOP (e.g., the TXOP 302) in the shared spectrum. The second wireless communication device is associated with the first network operating entity.

At step 1130, the method 1100 includes communicating data (e.g., the data 412) with the second wireless communication device in a second link direction during the TXOP. For example, the first link direction may be DL and the second link direction may be UL. Alternatively, the first link direction may be UL and the second link direction may be DL.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure further include a method of wireless communication including communicating, by a first wireless communication device, a control information communication protection request over a shared spectrum, wherein the shared spectrum is shared by a plurality of network operating entities based on priorities, and wherein the first wireless communication device is associated with a first network operating entity of the plurality of network operating entities; communicating, by the first wireless communication device with a second wireless communication device associated with the first network operating entity, control information in a first link direction during a transmission opportunity (TXOP) in the shared spectrum; and communicating, by the first wireless communication device with the second wireless communication device, data in a second link direction during the TXOP.

The method further includes wherein the first link direction and the second link direction are different. The method further includes wherein the communicating the control information communication protection request over the shared spectrum includes transmitting, by the first wireless communication device, the control information communication protection request, and wherein the communicating the control information in the first link direction during the TXOP includes receiving, by the first wireless communication device from the second wireless communication device, the control information. The method further includes transmitting, by the first wireless communication device to the second wireless communication device, a reservation for the TXOP, wherein the control information communication protection request is communicated in response to the reservation. The method further includes receiving, by the first wireless communication device from the second wireless communication device, a reservation for the TXOP, wherein the control information communication protection request is communicated in response to the reservation. The method further includes transmitting, by the first wireless communication device, a reservation for another TXOP, wherein the reservation includes communication schedules for a group of wireless communication devices associated with the first network operating entity; and receiving, by the first wireless communication device from one or more wireless communication devices of the group of wireless communication devices in response to the reservation, protection request signals for protecting communication in the another TXOP. The method further includes detecting, by the first wireless communication device in a sensing period of another TXOP, a reservation for the another TXOP from a second network operating entity of the plurality of network operating entities; and refraining, by the first wireless communication device, from communication in the another TXOP based on the detecting. The method further includes detecting, by the first wireless communication device in a sensing period of another TXOP, a control information communication protection request for the another TXOP from a second network operating entity of the plurality of network operating entities; and refraining, by the first wireless communication device, from communication in the another TXOP based on the detecting. The method further includes detecting, by the first wireless communication device in a sensing period of another TXOP, a data communication protection request for the another TXOP from a second network operating entity of the plurality of network operating entities; and refraining, by the first wireless communication device, from communication in the another TXOP based on the detecting. The method further includes monitoring, by the first wireless communication device, in a sensing period of another TXOP, for a data communication protection request for the another TXOP, wherein the first link direction has priority over the second link direction in the another TXOP; and switching, by the first wireless communication device, a link priority of at least a portion of the another TXOP from the first link direction to the second link direction based on the monitoring. The method further includes communicating, by the first wireless communication device with the second wireless communication device, a data communication protection request for the TXOP. The method further includes wherein the data is communicated in the second link direction during a first subframe of the TXOP, and wherein the data communication protection request is communicated in a sensing period within the first subframe of the TXOP. The method further includes communicating, by the first wireless communication device in a sensing period of a second subframe of the TXOP, a data communication protection request for the second subframe of the TXOP; and communicating, by the first wireless communication device with a third wireless communication device associated with the first network operating entity, data in the first link direction during a data transmission period within the second subframe of the TXOP. The method further includes monitoring, by the first wireless communication device, in a sensing period of a second subframe of the TXOP, for a data communication protection request for the second subframe of the TXOP, wherein the second link direction has priority over the first link direction in the second subframe of the TXOP; and switching, by the first wireless communication device, a link priority of the second subframe from the second link direction to the first link direction based on the monitoring. The method further includes wherein the first subframe is a self-contained subframe including a downlink control period, a data period, and an uplink control period, and wherein the data is communicated in the data period of the first subframe. The method further includes wherein the control information communication protection request includes a pre-determined preamble sequence.

Embodiments of the present disclosure further include an apparatus including a transceiver configured to communicate a control information communication protection request over a shared spectrum, wherein the shared spectrum is shared by a plurality of network operating entities based on priorities, and wherein the apparatus is associated with a first network operating entity of the plurality of network operating entities; communicate, with a second wireless communication device associated with the first network operating entity, control information in a first link direction during a transmission opportunity (TXOP) in the shared spectrum; and communicate, with the second wireless communication device, data in a second link direction during the TXOP.

The apparatus further includes wherein the first link direction and the second link direction are different. The apparatus further includes wherein the transceiver is further configured to communicate the control information communication protection request over the shared spectrum by transmitting the control information communication protection request, communicate the control information in the first link direction during the TXOP by receiving, from the second wireless communication device, the control information. The apparatus further includes wherein the transceiver is further configured to transmit, to the second wireless communication device, a reservation for the TXOP, wherein the control information communication protection request is communicated in response to the reservation. The apparatus further includes wherein the transceiver is further configured to receive, from the second wireless communication device, a reservation for the TXOP, wherein the control information communication protection request is communicated in response to the reservation. The apparatus further includes wherein the transceiver is further configured to transmit a reservation for another TXOP, wherein the reservation includes communication schedules for a group of wireless communication devices associated with the first network operating entity; and receive, from one or more wireless communication devices of the group of wireless communication devices in response to the reservation, protection request signals for protecting communication in the another TXOP. The apparatus further includes a processor configured to detect, in a sensing period of another TXOP, a reservation for the another TXOP from a second network operating entity of the plurality of network operating entities; and refrain from communication in the another TXOP when the reservation for the another TXOP is detected. The apparatus further includes a processor configured to: detect, in a sensing period of another TXOP, a control information communication protection request for the another TXOP from a second network operating entity of the plurality of network operating entities; and refrain from communication in the another TXOP when the control information communication protection request for the another TXOP is detected. The apparatus further includes a processor configured to detect, in a sensing period of another TXOP, a data communication protection request for the another TXOP from a second network operating entity of the plurality of network operating entities; and refrain from communication in the another TXOP when the data communication protection request for the another TXOP is detected. The apparatus further includes a processor configured to monitor, in a sensing period of another TXOP, for a data communication protection request for the another TXOP, wherein the first link direction has priority over the second link direction in the another TXOP; and switch a link priority of at least a portion of the another TXOP from the first link direction to the second link direction based on the monitoring. The apparatus further includes wherein the transceiver is further configured to communicate, with the second wireless communication device, a data communication protection request for the TXOP. The apparatus further includes wherein the data is communicated in the second link direction during a first subframe of the TXOP, and wherein the data communication protection request is communicated in a sensing period within the first subframe of the TXOP. The apparatus further includes wherein the transceiver is further configured to communicate, in a sensing period of a second subframe of the TXOP, a data communication protection request for the second subframe of the TXOP; and communicate, with a third wireless communication device associated with the first network operating entity, data in the first link direction during a data transmission period within the second subframe of the TXOP. The apparatus further includes a processor configured to monitor, in a sensing period of a second subframe of the TXOP, for a data communication protection request for the second subframe of the TXOP, wherein the second link direction has priority over the first link direction in the second subframe of the TXOP; and switch a link priority of the second subframe from the second link direction to the first link direction based on the monitoring. The apparatus further includes wherein the first subframe is a self-contained subframe including a downlink control period, a data period, and an uplink control period, and wherein the data is communicated in the data period of the first subframe. The apparatus further includes wherein the control information communication protection request includes a pre-determined preamble sequence.

Embodiments of the present disclosure further include a computer-readable medium having program code recorded thereon, the program code comprising code for causing a first wireless communication device to communicate a control information communication protection request over a shared spectrum, wherein the shared spectrum is shared by a plurality of network operating entities based on priorities, and wherein the first wireless communication device is associated with a first network operating entity of the plurality of network operating entities; code for causing the first wireless communication device to communicate, with a second wireless communication device associated with the first network operating entity, control information in a first link direction during a transmission opportunity (TXOP) in the shared spectrum; and code for causing the first wireless communication device to communicate, with the second wireless communication device, data in a second link direction during the TXOP.

The computer-readable medium further includes wherein the first link direction and the second link direction are different. The computer-readable medium further includes wherein code for communicating the control information communication protection request over the shared spectrum is further configured to transmit the control information communication protection request, and wherein the code for communicating the control information in the first link direction during the TXOP is further configured to receive, from the second wireless communication device, the control information. The computer-readable medium further includes code for causing the first wireless communication device to transmit, to the second wireless communication device, a reservation for the TXOP, wherein the control information communication protection request is communicated in response to the reservation. The computer-readable medium further includes code for causing the first wireless communication device to receive, from the second wireless communication device, a reservation for the TXOP, wherein the control information communication protection request is communicated in response to the reservation. The computer-readable medium further includes code for causing the first wireless communication device to transmit a reservation for another TXOP, wherein the reservation includes communication schedules for a group of wireless communication devices associated with the first network operating entity; and code for causing the first wireless communication device to receive, from one or more wireless communication devices of the group of wireless communication devices in response to the reservation, protection request signals for protecting communication in the another TXOP. The computer-readable medium further includes code for causing the first wireless communication device to detect, in a sensing period of another TXOP, a reservation for the another TXOP from a second network operating entity of the plurality of network operating entities; and code for causing the first wireless communication device to refrain from communication in the another TXOP when the reservation for the another TXOP is detected. The computer-readable medium further includes code for causing the first wireless communication device to detect, in a sensing period of another TXOP, a control information communication protection request for the another TXOP from a second network operating entity of the plurality of network operating entities; and code for causing the first wireless communication device to refrain from communication in the another TXOP based on the detecting. The computer-readable medium further includes code for causing the first wireless communication device to detect, in a sensing period of another TXOP, a data communication protection request for the another TXOP from a second network operating entity of the plurality of network operating entities; and code for causing the first wireless communication device to refrain from communication in the another TXOP based on the detecting. The computer-readable medium further includes code for causing the first wireless communication device to monitor, in a sensing period of another TXOP, for a data communication protection request for the another TXOP, wherein the first link direction has priority over the second link direction in the another TXOP; and code for causing the first wireless communication device to switch a link priority of at least a portion of the another TXOP from the first link direction to the second link direction based on the monitoring. The computer-readable medium further includes code for causing the first wireless communication device to communicate, with the second wireless communication device, a data communication protection request for the TXOP. The computer-readable medium further includes wherein the data is communicated in the second link direction during a first subframe of the TXOP, and wherein the data communication protection request is communicated in a sensing period within the first subframe of the TXOP. The computer-readable medium further includes code for causing the first wireless communication device to communicate, in a sensing period of a second subframe of the TXOP, a data communication protection request for the second subframe of the TXOP; and code for causing the first wireless communication device to communicate, with a third wireless communication device associated with the first network operating entity, data in the first link direction during a data transmission period within the second subframe of the TXOP. The computer-readable medium further includes code for causing the first wireless communication device to monitor, in a sensing period of a second subframe of the TXOP, for a data communication protection request for the second subframe of the TXOP, wherein the second link direction has priority over the first link direction in the second subframe of the TXOP; and code for causing the first wireless communication device to switch a link priority of the second subframe from the second link direction to the first link direction based on the monitoring. The computer-readable medium further includes wherein the first subframe is a self-contained subframe including a downlink control period, a data period, and an uplink control period, and wherein the data is communicated in the data period of the first subframe. The computer-readable medium further includes wherein the control information communication protection request includes a pre-determined preamble sequence.

Embodiments of the present disclosure further include an apparatus including means for communicating a control information communication protection request over a shared spectrum, wherein the shared spectrum is shared by a plurality of network operating entities based on priorities, and wherein the apparatus is associated with a first network operating entity of the plurality of network operating entities; means for communicating, with a second wireless communication device associated with the first network operating entity, control information in a first link direction during a transmission opportunity (TXOP) in the shared spectrum; and means for communicating, with the second wireless communication device, data in a second link direction during the TXOP.

The apparatus further includes wherein the first link direction and the second link direction are different. The apparatus further includes means for communicating the control information communication protection request over the shared spectrum by transmitting the control information communication protection request; and means for communicating the control information in the first link direction during the TXOP by receiving, from the second wireless communication device, the control information. The apparatus further includes means for transmitting, to the second wireless communication device, a reservation for the TXOP, wherein the control information communication protection request is communicated in response to the reservation. The apparatus further includes means for receiving, from the second wireless communication device, a reservation for the TXOP, wherein the control information communication protection request is communicated in response to the reservation. The apparatus further includes means for transmitting a reservation for another TXOP, wherein the reservation includes communication schedules for a group of wireless communication devices associated with the first network operating entity; and means for receiving, from one or more wireless communication devices of the group of wireless communication devices in response to the reservation, protection request signals for protecting communication in the another TXOP. The apparatus further includes means for detecting, in a sensing period of another TXOP, a reservation for the another TXOP from a second network operating entity of the plurality of network operating entities; and means for refraining from communication in the another TXOP based on the detecting. The apparatus further includes means for detecting, in a sensing period of another TXOP, a control information communication protection request for the another TXOP from a second network operating entity of the plurality of network operating entities; and means for refraining from communication in the another TXOP based on the detecting. The apparatus further includes means for detecting, in a sensing period of another TXOP, a data communication protection request for the another TXOP from a second network operating entity of the plurality of network operating entities; and means for refraining from communication in the another TXOP based on the detecting. The apparatus further includes means for monitoring, in a sensing period of another TXOP, for a data communication protection request for the another TXOP, wherein the first link direction has priority over the second link direction in the another TXOP; and means for switching a link priority of at least a portion of the another TXOP from the first link direction to the second link direction based on the monitoring. The apparatus further includes means for communicating, with the second wireless communication device, a data communication protection request for the TXOP. The apparatus further includes wherein the data is communicated in the second link direction during a first subframe of the TXOP, and wherein the data communication protection request is communicated in a sensing period within the first subframe of the TXOP. The apparatus further includes means for communicating, in a sensing period of a second subframe of the TXOP, a data communication protection request for the second subframe of the TXOP; and means for communicating, with a third wireless communication device associated with the first network operating entity, data in the first link direction during a data transmission period within the second subframe of the TXOP. The apparatus further includes means for monitoring, in a sensing period of a second subframe of the TXOP, for a data communication protection request for the second subframe of the TXOP, wherein the second link direction has priority over the first link direction in the second subframe of the TXOP; and means for switching a link priority of the second subframe from the second link direction to the first link direction based on the monitoring. The apparatus further includes wherein the first subframe is a self-contained subframe including a downlink control period, a data period, and an uplink control period, and wherein the data is communicated in the data period of the first subframe. The apparatus further includes wherein the control information communication protection request includes a pre-determined preamble sequence.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:
1. A method of wireless communication, comprising:
   communicating, by a first wireless communication device, a control information communication protection request over a shared spectrum, wherein the shared spectrum is shared by a plurality of network operating entities based on priorities, and wherein the first wireless communication device is associated with a first network operating entity of the plurality of network operating entities, wherein the control information communication protection request is communicated following a request from the first network operating entity for a reservation of a transmission opportunity (TXOP) in the shared spectrum, wherein the first network operating entity operates a first network, and wherein another network operating entity of the plurality of network operating entities operates another network different from the first network;
communicating, by the first wireless communication device with a second wireless communication device associated with the first network operating entity, control information in a first link direction during the TXOP in the shared spectrum; and
communicating, by the first wireless communication device with the second wireless communication device, data in a second link direction during the TXOP.

2. The method of claim 1, wherein the first link direction and the second link direction are different.

3. The method of claim 1, wherein the communicating the control information communication protection request over the shared spectrum includes transmitting, by the first wireless communication device, the control information communication protection request, and wherein the communicating the control information in the first link direction during the TXOP includes receiving, by the first wireless communication device from the second wireless communication device, the control information.

4. The method of claim 1, further comprising transmitting, by the first wireless communication device to the second wireless communication device, the reservation for the TXOP, wherein the control information communication protection request is communicated in response to the reservation.

5. The method of claim 1, further comprising receiving, by the first wireless communication device from the second wireless communication device, the reservation for the TXOP, wherein the control information communication protection request is communicated in response to the reservation.

6. The method of claim 1, further comprising:
transmitting, by the first wireless communication device, a reservation for another TXOP, wherein the reservation includes communication schedules for a group of wireless communication devices associated with the first network operating entity; and
receiving, by the first wireless communication device from one or more wireless communication devices of the group of wireless communication devices in response to the reservation, protection request signals for protecting communication in the another TXOP.

7. The method of claim 1, further comprising:
detecting, by the first wireless communication device in a sensing period of another TXOP, at least one of a reservation, a control information communication protection request, or a data communication protection request for the another TXOP from a second network operating entity of the plurality of network operating entities; and
refraining, by the first wireless communication device, from communication in the another TXOP based on the detecting.

8. The method of claim 1, further comprising:
monitoring, by the first wireless communication device, in a sensing period of another TXOP, for a data communication protection request for the another TXOP, wherein the first link direction has priority over the second link direction in the another TXOP; and
switching, by the first wireless communication device, a link priority of at least a portion of the another TXOP from the first link direction to the second link direction based on the monitoring.

9. The method of claim 1, further comprising communicating, by the first wireless communication device with the second wireless communication device, a data communication protection request for the TXOP.

10. The method of claim 9, wherein the data is communicated in the second link direction during a first subframe of the TXOP, and wherein the data communication protection request is communicated in a sensing period within the first subframe of the TXOP.

11. The method of claim 10, further comprising:
communicating, by the first wireless communication device in a sensing period of a second subframe of the TXOP, a data communication protection request for the second subframe of the TXOP; and
communicating, by the first wireless communication device with a third wireless communication device associated with the first network operating entity, data in the first link direction during a data transmission period within the second subframe of the TXOP.

12. The method of claim 10, further comprising:
monitoring, by the first wireless communication device, in a sensing period of a second subframe of the TXOP, for a data communication protection request for the second subframe of the TXOP, wherein the second link direction has priority over the first link direction in the second subframe of the TXOP; and
switching, by the first wireless communication device, a link priority of the second subframe from the second link direction to the first link direction based on the monitoring.

13. The method of claim 1, wherein the control information communication protection request includes a pre-determined preamble sequence.

14. An apparatus comprising:
a transceiver configured to:
communicate a control information communication protection request over a shared spectrum, wherein the shared spectrum is shared by a plurality of network operating entities based on priorities, and wherein the apparatus is associated with a first network operating entity of the plurality of network operating entities, wherein the control information communication protection request is communicated following a request from the first network operating entity for a reservation of a transmission opportunity (TXOP) in the shared spectrum, wherein the first network operating entity operates a first network, and wherein another network operating entity of the plurality of network operating entities operates another network different from the first network;
communicate, with a second wireless communication device associated with the first network operating entity, control information in a first link direction during the TXOP in the shared spectrum; and
communicate, with the second wireless communication device, data in a second link direction during the TXOP.

15. The apparatus of claim 14, wherein the first link direction and the second link direction are different.

16. The apparatus of claim 14, wherein the transceiver is further configured to:
communicate the control information communication protection request over the shared spectrum by transmitting the control information communication protection request,
communicate the control information in the first link direction during the TXOP by receiving, from the second wireless communication device, the control information.

17. The apparatus of claim 14, wherein the transceiver is further configured to transmit, to the second wireless communication device, the reservation for the TXOP, wherein the control information communication protection request is communicated in response to the reservation.

18. The apparatus of claim 14, wherein the transceiver is further configured to receive, from the second wireless communication device, the reservation for the TXOP, wherein the control information communication protection request is communicated in response to the reservation.

19. The apparatus of claim 14, wherein the transceiver is further configured to:
transmit a reservation for another TXOP, wherein the reservation includes communication schedules for a group of wireless communication devices associated with the first network operating entity; and
receive, from one or more wireless communication devices of the group of wireless communication devices in response to the reservation, protection request signals for protecting communication in the another TXOP.

20. The apparatus of claim 14, further comprising a processor configured to:
detect, in a sensing period of another TXOP, at least one of a reservation, a control information communication protection request, or a data communication protection request, for the another TXOP from a second network operating entity of the plurality of network operating entities; and
refrain from communication in the another TXOP when the reservation for the another TXOP is detected.

21. The apparatus of claim 14, further comprising a processor configured to:
monitor, in a sensing period of another TXOP, for a data communication protection request for the another TXOP, wherein the first link direction has priority over the second link direction in the another TXOP; and
switch a link priority of at least a portion of the another TXOP from the first link direction to the second link direction based on the monitoring.

22. The apparatus of claim 14, wherein the transceiver is further configured to communicate, with the second wireless communication device, a data communication protection request for the TXOP.

23. The apparatus of claim 22, wherein the data is communicated in the second link direction during a first subframe of the TXOP, and wherein the data communication protection request is communicated in a sensing period within the first subframe of the TXOP.

24. The apparatus of claim 23, wherein the transceiver is further configured to:
communicate, in a sensing period of a second subframe of the TXOP, a data communication protection request for the second subframe of the TXOP; and
communicate, with a third wireless communication device associated with the first network operating entity, data in the first link direction during a data transmission period within the second subframe of the TXOP.

25. The apparatus of claim 23, further comprising a processor configured to:
monitor, in a sensing period of a second subframe of the TXOP, for a data communication protection request for the second subframe of the TXOP, wherein the second link direction has priority over the first link direction in the second subframe of the TXOP; and
switch a link priority of the second subframe from the second link direction to the first link direction based on the monitoring.

26. The apparatus of claim 14, wherein the control information communication protection request includes a predetermined preamble sequence.

27. A computer-readable medium having program code recorded thereon, the program code comprising:
code for causing a first wireless communication device to communicate a control information communication protection request over a shared spectrum, wherein the shared spectrum is shared by a plurality of network operating entities based on priorities, and wherein the first wireless communication device is associated with a first network operating entity of the plurality of network operating entities, wherein the control information communication protection request is communicated following a request from the first network operating entity for a reservation of a transmission opportunity (TXOP) in the shared spectrum, wherein the first network operating entity operates a first network, and wherein another network operating entity of the plurality of network operating entities operates another network different from the first network;
code for causing the first wireless communication device to communicate, with a second wireless communication device associated with the first network operating entity, control information in a first link direction during the TXOP in the shared spectrum; and
code for causing the first wireless communication device to communicate, with the second wireless communication device, data in a second link direction during the TXOP.

28. The computer-readable medium of claim 27, wherein the first link direction and the second link direction are different.

29. The computer-readable medium of claim 27, further comprising:
code for causing the first wireless communication device to transmit, to the second wireless communication device, the reservation for the TXOP; or
code for causing the first wireless communication device to receive, from the second wireless communication device, the reservation for the TXOP,
wherein the control information communication protection request is communicated in response to the transmitted reservation or the received reservation.

30. The computer-readable medium of claim 27, further comprising:
code for causing the first wireless communication device to detect, in a sensing period of another TXOP, at least one of a reservation, a control information communication protection request, or a data communication protection request for the another TXOP from a second network operating entity of the plurality of network operating entities; and code for causing the first wireless communication device to refrain from communication in the another TXOP when the reservation for the another TXOP is detected.

* * * * *